United States Patent Office 3,137,675
Patented June 16, 1964

3,137,675
FIBERS AND SHAPED ARTICLES CONSISTING OF ACETALIZED POLYVINYL ALCOHOL AND A COPOLYMER OF VINYLIDENE CYANIDE AND VINYL ACETATE AND METHOD OF MAKING SAME
Kanji Matsubayashi and Osamu Fukushima, Kurashiki, Japan, assignors to Kurashiki Rayon Company, Limited, Kurashiki, Japan
No Drawing. Filed Mar. 2, 1961, Ser. No. 92,769
Claims priority, application Japan Mar. 5, 1960
15 Claims. (Cl. 260—45.5)

This invention relates to a method of manufacturing fibers, filaments, films and other shaped articles, which comprises mixing and dissolving (1) polyvinyl alcohol derivatives or copolymers of vinyl alcohol which are insoluble in water and soluble in an organic solvent together with (2) a copolymer of vinylidene cyanide and vinyl acetate to provide a mixed spinning solution, and extruding said mixed spinning solution into a coagulating bath or in air.

The object of the invention is to provide synthetic fibers and other shaped articles which have excellent dyeability, hot water resistance, dry heat resistance and also splendid elasticity and tensile strength by simple means at a lower cost.

The present invention can be applied generally to the manufacture of fibers, filaments, films and other shaped articles of the mixture of polyvinyl alcohol derivatives or copolymer of vinyl alcohol and copolymer of vinylidene cyanide and vinyl acetate, but the following description is taken principally about the fiber or filament, and the description can be applied to the other shaped articles.

The filaments obtained each independently from polyvinyl alcohol derivatives or copolymer of vinylidene cyanide and vinyl acetate have the following defects:

The fibers of polyvinyl formal as a derivative of polyvinyl alcohol have sufficient dyeability and dry heat resistance, but they have very poor hot water resistance so that they have not been used in practice as raw material of synthetic fibers up to the present.

On the other hand, the filaments of copolymer of vinylidene cyanide and vinyl acetate have sufficient hot water resistance and elasticity, but they have lower tensile strength and very poor dyeability. Accordingly it is very important to obviate the above defects.

According to the present invention, the defects inherent to each of polyvinyl alcohol derivative, copolymer of vinylidene cyanide and vinyl acetate can be obviated and improved without spoiling the advantages inherent to each independent fibers. The invention relates to a method of manufacturing mixed fibers by spinning a mixed spinning solution made by dissolving a mixture of water insoluble and soluble in an organic solvent polyvinyl alcohol derivative or copolymer of vinyl alcohol and copolymer of vinylidene cyanide and vinyl acetate by any of dry method or wet method.

In general, when two different high polymers are mixed together and dissolved in a solvent there occurs often demixing with the two high polymers separation into two layers owing to the difference in solubilities and it is impossible to manufacture a mixed fiber industrially from these two different high polymers.

Moreover, the mixed fibers obtained from two high polymers often causes the decrease in hot water resistance, dry heat resistance or tensile strength due to the disturbance of orientation and crystallization so that the physical properties are very often lower than those of the fiber obtained from each of these high polymers independently.

On the contrary, according to the present invention it has been found that there occurs no appreciable demixing in the mixed solution after mixed dissolution and more particularly, there occurs substantially no unevenness of the mixed fiber which was considered to occur by the demixing in some kinds of polyvinyl alcohol derivatives. The largest specialty of this invention is that when a mixed fiber is made generally almost all of the high polymers having well known fiber forming ability are such high polymers as to form fiber by the cooperation of the crystalline part and the non crystalline part, and in the mixed fiber obtained from such high polymers there is such fact that the physical property is lower than that of the fiber obtained by a single polymer in such a point that the fibrillation phenomena is more remarkable due to the difference between the most suitable hot drawing temperature and the most suitable crystallization temperature, or disturbance of crystallization owing to the mixing and also each independent crystallization of the different high polymers. But in case of the mixed fiber of the present invention there is absolutely no such fact.

The reason of this is that polyvinyl alcohol derivative or copolymer of vinyl alcohol or copolymer of vinylidene cyanide and vinyl acetate is an amorphous polymer in its individual state and that copolymer of vinylidene cyanide and vinyl acetate have a very high second order transition higher than 100° C. and that the dry heat resistances of these high polymers, that is, most suitable hot drawing temperatures are very close with each other which has mutual influence.

In accordance with this invention, the disadvantages inherent to each composition are obviated in the mixed filament and it is characterized in that new synthetic fibers are obtained having superior physical properties which could not be appreciated in case of each independent composition. The mixed fibers of this invention have very high water imbibition which has never been recognized in known synthetic fibers, when the mixed fiber is manufactured by adding more than 50% of polyvinyl formal, for instance, as a polyvinyl alcohol derivative to copolymer of vinylidene cyanide and vinyl acetate, and such high water imbibition is a remarkable characteristic as fibers for clothings. As to the fibrillation effect of the mixed fibers most of the mixed fibers have defects of causing fibrillation, yet if the temperature of heat treatment at hot drawing, hot shrinkage or the heat treatment under constant length after spun is taken higher than 200° C. it has the characteristics of almost the same fibrillation compared with that of the fiber obtained by an independent polymer, that is, known synthetic fibers. As to the dyeability of the synthetic fibers there are quite many investigations done up to the present and a certain degree of solution was arrived at, for instance, introducing basic nitrogen. The mixed fiber of this invention has substantially same dyeability to direct colors under the same dyeing condition as viscous fiber or cotton and the fastness of dyeings is very satisfactory so that it has excellent dyeing characteristics.

As an example, the physical properties and dyeability of the fibers prepared from each independent material of polyvinyl formal (the degree of formalization: 65%) and copolymer of vinylidene cyanide and vinyl acetate, and the mixed fibers obtained from the mixed spinning solution at a ratio of 1:1 of the above materials are shown as follows:

(A) Polyvinyl formal film
(B) Copolymer of vinylidene cyanide and vinyl acetate fiber
(C) Mixed fiber of the invention

TABLE I

|  | (A) | (B) | (C) |
|---|---|---|---|
| Denier | 3.0 | 3.2 | 3.0 |
| Dry tensile tenacity (g./d.) | 3.5 | 2.3 | 3.4 |
| Wet tensile tenacity (g./d.) | 2.0 | 1.8 | 2.6 |
| Dry elongation (percent) | 25 | 25 | 21 |
| Wet elongation (percent) | 23 | 28 | 23 |
| Elastic recovery 3% (percent) | 65 | 82 | 80 |
| Elastic recovery 5% (percent) | 55 | 65 | 70 |
| Wet softening temperature (° C.) | 50 | 110 | 110 |
| Dry softening temperature (° C.) | 180 | 180 | 180 |
| Water imbibition (percent) | 50 | 3 | 25 |
| Dyeability (mg. dye/g. fiber): |  |  |  |
| 1, direct color [1] | 19.0 | 1.0 | 19.0 |
| 2, disperse color [1] | 19.3 | 1.0 | 19.0 |

[1] 1, Congo Red (C.I. Direct Red 28); 2, Diacelliton Fast Brilliant Blue BF (C.I. Disperse Blue 3).

From the above description it will be clear that the mixed fiber of polyvinyl alcohol derivative or copolymer of vinyl alcohol and copolymer of vinylidene cyanide and vinyl acetate has quite many specialities. As polyvinyl alcohol derivatives or copolymer of vinyl alcohol, which are insoluble in water and soluble in an organic solvent to be used in this invention, use is made of acetalization product by aliphatic or aromatic aldehyde, such as formaldehyde, benzaldehyde, acetaldehyde, propionaldehyde, butyraldehyde, octyl aldehyde, nonyl aldehyde, chlorobenzaldehyde, dichlorobenzaldehyde, phenylacetaldehyde, hexahydrobenzaldehyde, phenoxyacetaldehyde of polyvinyl alcohol, or mixed acetalization product thereof, or cyanoethylation product by acrylonitrile of polyvinyl alcohol, or urethane obtained by the reaction of polyvinyl alcohol and urea, phenyl isocyanate or phenylurea, or esterification product of polyvinyl alcohol and formic acid, acetic acid or benzoic acid, or saponification product of polyvinyl alcohol derivative which is water insoluble and soluble in an organic solvent such as acetalization product thereof, and vinyl ester and ethylene, propylene or vinyl chloride and the like copolymer, or acetalization product thereof and the like copolymer of vinyl alcohol.

As polyvinyl alcohol derivative or copolymer of vinyl alcohol containing basic nitrogen use is made of the reaction product of polyvinyl alcohol with ethylene imine, 1-dimethyl-amino-2,3-epoxy propane, or 1-methylethyl-amino-2,3-epoxy propane; amino-acetalization product of polyvinyl alcohol with amino-acetaldehyde, methylamino acetaldehyde, nonylamino acetaldehyde, β-dimethylaminopropionaldehyde, β-aminobutyraldehyde, β-dimethylaminobutyraldehyde, or β-cyclohexylaminobutyraldehyde; vinyl or vinylidene monomers having basic nitrogen such as vinyl ester and allylamine, diethylallylamine, β-diethylaminoethyl methacrylate, 4-vinylpyridine, 2-vinylpyridine, or 2-methyl-5-vinylpyridine; or saponified copolymers thereof, quaternization product by dimethyl sulfate or ethylbromide, or acetalization products thereof or those having basic nitrogen introduced for the polymer containing a group which is convertable to basic nitrogen, such as copolymer of vinyl acetate and vinyl chloride treated with ammonia liquor to introduce amino group and at the same time to effect saponification.

As polyvinyl alcohol derivatives containing acid group or copolymers of vinyl alcohol use is made of the acetalization products of polyvinyl alcohol by aldehyde containing acid group such as α-sulfoacetaldehyde, β-sulfobutyraldehyde, and O-sulfobenzaldehyde, or saponification products of copolymers of vinyl monomer containing acid group such as allyl sulfonic acid, vinyl sulfonic acid, p-styrene sulfonic acid, or crotonic acid and vinyl ester, or acetalization products thereof.

Further, polymers containing such a group to be convertable to an acid group, to which an acid group is introduced, such as copolymers of allyl bromide and vinyl acetate saponified with alkalis and further reacted with sodium sulfite to introduce sulfo group may be used.

The content of vinyl alcohol monomer unit of these polyvinyl alcohol derivatives or copolymers of vinyl alcohol is necessary to be in the limited range of that these polymers are insoluble in water, yet its actual amount is different according to the hydrophobic state of the hydrophobic part thereof so that it can not be specified in general and it is reasonable to make the vinyl alcohol unit less than 90% of the total vinyl monomer unit.

The most suitable solvent to be used in this invention depends on quite many conditions, such as, the degree of polymerization of copolymer of vinylidene cyanide and vinyl acetate, the degree of polymerization, kinds, content of vinyl alcohol monomer or the mixture ratio of the two polymers of the polyvinyl alcohol derivatives or copolymer of vinyl alcohol, or according to the method of spinning such as dry spinning or wet spinning, yet the following may be used, for instance, as a single solvent, dimethyl formamide, dimethyl sulfoxide, and as the mixed solvent, dimethyl formamide and water, dimethyl sulfoxide and water, acetonitrile and water, acetone or methyl alcohol and zinc chloride, or thiocyanate; or acetonitrile and acetone, dimethyl formamide or dimethyl sulfoxide and acetone and water.

Example I

Polyvinyl formal of the degree of formalization 60 mol percent (having the degree of polymerization 1700) and copolymer of vinylidene cyanide-vinyl acetate (the degree of polymerization 2000) were dissolved in dimethyl formamide respectively until each concentration becomes 25%, then the two spinning solutions were mixed at a ratio of 1:1 to prepare a mixed spinning solution of polyvinyl formal, copolymer of vinylidene cyanide and vinyl acetate.

The mixed solution was defoamed at 80° C. under the pressure of 2.5 kg./cm.² for 24 hours and extruded from the spinneret having 0.3 mm. dia. into air 240° C. and wound up at a speed at 150 meters/min. at a position of 4 meters below the spinneret. This fiber was hot drawn for 600% in air at 210° C. The mixed fiber of polyvinyl formal, copolymer of vinylidene cyanide and vinyl acetate thus obtained had splendid physical properties and dyeability as shown in Table I.

Example II

The powders of polyvinyl acetal (the degree of polymerization 1500) containing 0.15% of basic nitrogen acetalized by β-cyclohexylaminobutyraldehyde having the degree of formalization 65 mol percent and copolymer of vinylidene cyanide and vinyl acetate were mixed at a ratio of 1:1 and dissolved in the mixed solvent of dimethyl formamide and water at a ratio of 9:1 to make the concentration of solution 25%, and thus a mixed spinning solution was provided. This mixed spinning solution was spun and hot drawn in the same manner as Example I, and the mixed fiber thus obtained showed splendid physical properties similar to those shown in Table I and had very good dyeability to the direct dyestuff of course and to acid dyestuffs.

Example III

Polyvinyl formal (the degree of polymerization 2000) of the degree of formalization 60 mol percent and copolymer of vinylidene cyanide and vinyl acetate (the degree of polymerization 1800) were dissolved in dimethyl sulfoxide respectively to make the concentration of solution 15% and these two solutions were mixed at a ratio of 1:1 to prepare a mixed spinning solution. This solution was extruded through the spinneret having 0.08 mm. dia. into an aqueous solution containing 70% of dimethyl sulfoxide and after passed 2 meters in the coagulating bath it was passed through an aqueous solution containing 200 g./liter of sodium sulfate and taken up at a speed of 20 meters/min. The fiber was hot drawn for 500% in air at 205° C. and then the fiber was subjected to the heat treatment under the constant length in air at 210° C. The mixed fiber thus obtained had very good physical properties and dyeability similar to those of Example I.

Example IV

Polyvinyl formal (the degree of polymerization 2500) containing 0.2% basic nitrogen based on the allylamine of the degree of formalization 67 mol percent and the degree of acetalization 13 mol percent and copolymer of vinylidene cyanide and vinyl acetate (the degree of polymerization 2000) were dissolved in a mixed solvent consisting of 8.5 parts of acetonitrile and 1.5 parts of water at a ratio of 6:4 to make the concentration of the solution 25%, and thus a mixed spinning solution was obtained. This solution was extruded into air at 120° C. through the spinneret of 0.2 mm. dia. and wound up at a speed of 300 meters/min. at a position of 5 meters below the spinneret. This fiber was hot drawn for 500% in air at 200° C., then the fiber was subjected to 10% hot shrinkage in air at 210° C. The mixed fiber had splendid physical properties same as those in Table I.

Example V

Polyvinyl formal (the degree of polymerization 2000) of the degree of formalization 60 mol percent and copolymer of vinylidene cyanide and vinyl acetate were mixed at a ratio of 1:1 and dissolved in dimethyl sulfoxide to make the concentration of the solution 50%. The mixed solution was extruded by means of an extruder continuously through the spinneret having 0.5 mm. dia. into air at 300° C. and wound up at a speed of 200 meters/min. at a position of 3 meters below the spinneret. The fiber thus obtained was 500% hot drawn between hot rollers at 210° C. The mixed fiber thus obtained had good physical properties as shown in Table I.

Example VI

Polyvinyl formal (the degree of polymerization 1700) of the degree of formalization 66 mol percent and copolymer of vinylidene cyanide and vinyl acetate were dissolved in dimethyl sulfoxide at a ratio of 1:1 to make the concentration of the solution 15% to provide the mixed spinning solution. The solution was extruded through the spinneret of 0.08 mm. dia. into a 50% aqueous solution of sodium acetate and after passed 3 meters through the coagulating bath it was taken up at a speed of 7 meters/min. The fiber thus obtained was 800% hot drawn in air at 210° C. In the case of such method of manufacturing fibers the recovery of solvent is very easy and also the mixed fiber thus obtained had splendid physical properties as shown in Table I.

Example VII

Polyvinyl benzal (the degree of polymerization 1700) of the degree of benzalization 25 mol percent and copolymer of vinylidene cyanide and vinyl acetate were dissolved in dimethyl sulfoxide respectively to make the concentration of the solution 15% and the two solutions were mixed at the ratio of 6:4 to provide a mixed spinning solution. This solution was extruded through the spinneret having 0.08 mm. dia. into an aqueous solution of 50% sodium acetate and after passing 3 meters through the coagulating bath it was taken up at a speed of 10 meters/min. The fiber thus obtained was 600% hot drawn in air at 210° C. The mixed fiber thus obtained had a similarly good physical properties as those in Table I.

Example VIII

Polyvinyl benzal (the degree of polymerization 2000) of the degree of benzalization 50 mol percent and copolymer of vinylidene cyanide and vinyl acetate (the degree of polymerization 2000) were dissolved together in dimethyl formamide at a ratio of 1:1 to make the concentration of solution 25% to provide a mixed spinning solution. The solution was dry spun in the similar manner as Example I and subjected to the heat treatment, then the mixed fiber thus obtained showed the similar physical properties as those in Example I.

Example IX

Polyvinyl butyral (the degree of polymerization 2000) of the degree of acetalization 37 mol percent and copolymer of vinylidene cyanide and vinyl acetate were dissolved in acetone containing 20% dimethyl sulfoxide at a ratio of 1:1 to make the concentration of solution 16% to provide the mixed spinning solution. This solution was spun into an aqueous solution at 70° C. and wound up at a speed of 8 meters/min. The fiber thus obtained was 500% hot drawn in silicon oil at 190° C., and then subjected to 5% hot shrinkage in a silicon oil at 210° C.

Example X

Polyvinyl benzal (the degree of polymerization 1800) of the degree of benzalization 40% and the degree of acetylation 10 mol percent and copolymer of vinylidene cyanide and vinyl acetate were dissolved in 15% water containing acetonitrile at a ratio of 1:1 to make the concentration of solution 25% and the mixed spinning solution thus produced was extruded through the spinneret of 0.2 mm. dia. into air at 120° C. and wound up at a speed of 200 meters/min. at the part of 5 meters below the spinneret. The fiber thus obtained was hot drawn for 800% in air at 190° C. and at the same time subjected to the heat treatment under a constant length.

Example XI

Polyvinyl alcohol (the degree of polymerization 2000) which was cyanoethylated to the degree of etherification 51 mol percent and copolymer of vinylidene cyanide and vinyl acetate were dissolved together at a ratio of 3:7 in dimethyl sulfoxide to obtain the concentration of 15%. The mixed spinning solution thus obtained was spun and the fiber was subjected to heat treatment in the similar manner as Example III.

Example XII

Copolymer of ethylene and vinyl alcohol obtained by saponifying copolymer of ethylene and vinyl acetate containing 28.0 mol percent ethylene and copolymer of vinylidene cyanide and vinyl acetate were dissolved together at a ratio of 1:1 in dimethyl sulfoxide to obtain the concentration of 15% and the mixed spinning solution thus obtained was spun and the fiber was subjected to the heat treatment in a similar manner as Example III.

Example XIII

Polyvinyl benzal (the degree of polymerization 1700) of the degree of benzalization 30 mol percent containing 2.6 mol percent of 2-methyl-5-vinylpyridine and copolymer of vinylidene cyanide and vinyl acetate were dissolved at a ratio of 3:7 in dimethyl sulfoxide to make the concentration of solution 15% and the mixed spinning solution thus obtained was spun and the fiber was subjected to the heat treatment in the similar manner as Example III.

Example XIV

Polyvinyl benzal of the degree of benzalization 41.1 mol percent and the degree of sulfoacetalization of 4.3 mol percent and copolymer of vinylidene cyanide and vinyl acetate were dissolved together at a ratio of 1:1 in dimethyl sulfoxide, and the mixed spinning solution thus obtained was spun and the fiber was subjected to the heat treatment in the similar manner as Example III. The mixed fiber thus obtained had physical properties as shown in Table I.

Example XV

Polyvinyl formal (the degree of polymerization 1800) of the degree of formalization 40 mol percent containing 0.2% of basic nitrogen which was acetalized with α-dimethylamino acetaldehyde was mixed with copolymer of vinylidene cyanide and vinyl acetate (the degree of polymerization 2000) at the rate of 10% and the mixed powders were dissolved in acetone containing 10% of dimethyl sulfoxide to make the concentration of solution 20% and the mixed spinning solution thus obtained was extruded through the spinneret having 0.3 mm. dia. into air at 120° C. and wound up at a speed 200 meters/min. at the position of 5 meters below the spinneret. The fiber thus obtained after water washed and dried was subjected to 500% hot draw in air at 210° C.

Example XVI

A mixture of 15 g. of acid-free polyvinyl alcohol (the degree of acetalization 48.1 mol percent and the degree of polymerization of 1600) which was acetalized with β-cyclohexylaminobutyraldehyde, 135 g. of copolymer of vinylidene cyanide and vinyl acetate, 30 g. of acetic acid, 150 g. of water and 670 g. of acetone was sealed and dissolved polymers warmed to 65° C. The spinning solution thus obtained was extruded through the spinneret having 0.5 mm. dia. into hot air and hot drawn for 300% in one minute at 180° C., and then subjected to the heat treatment under a constant length at 180° C. for 3 minutes. The filament thus obtained had the tenacity of 1.5 g./d., breaking elongation of 45% and when it was dyed with Acid Brilliant Scarlet 3R (C.I. Acid Red 18) 4%, sulfuric acid 2% at 100° C. for 2 hours. The fiber absorbed the dyestuff and showed deep scarlet color.

On the other hand, the filament without amino acetalized polyvinyl alcohol and similarly spun and subjected to hot draw and heat treatment showed the tenacity of 1.6 g./d. and breaking elongation of 48%, but the fiber could not be absolutely dyed with this acid dyestuff.

Example XVII

Acid-free polyvinyl alcohol (the degree of polymerization of 1700) having the degree of acetalization 6 mol percent and 74 mol percent respectively, which were acetalized with β-aminobutyraldehyde and formaldehyde respectively were mixed with acetonitrile containing 20% water at 60° C. and were dissolved with addition of a small amount of formic acid.

Then three times quantity of polyvinyl acetal of copolymer of vinylidene cyanide and vinyl acetate (the degree of polymerization 2000) were added and dissolved to provide the spinning solution of 15% concentration of the total polymer, then the solution was wet spun into water at 60° C. and hot drawn for 700% in air at 200° C. The fiber thus obtained showed the tenacity of 2.3 g./d. and breaking elongation of 24%.

The fiber thus obtained was dyed with Acid Scarlet 3R (C.I. Acid Red 18) 4% and sulfuric acid 2% at 95° C. for 2 hours and the fiber completely absorbed the dyestuff and showed brilliant and deep color.

The wash fastness of the fiber was very excellent and no desorption of the dye was recognized by washing the fiber in an aqueous solution containing 3 g./liter of sodium laurylbenzenesulfonate at 60° C. for 30 minutes. If it is dyed by means of direct color or dispersed color in Table I the fiber adsorbed a greater part of dyestuff and showed brilliant and deep color which had excellent fastness.

What we claim is:

1. A method for manufacturing shaped articles which comprises mixing (1) 10 to 60 weight percent of a reaction product insoluble in water but soluble in an organic solvent of a polymer of vinyl alcohol and a compound selected from the group consisting of an aldehyde with up to 9 carbon atoms, acrylonitrile, urea, phenyl isocyanate, phenylurea, a carboxylic acid with up to 7 carbon atoms, ethylene imine, 1-dimethyl-amino-2,3-epoxy propane, 1-methylethylamino-2,3-epoxy propane, an amino-aldehyde with up to 10 carbon atoms, allylamine, diethylallylamine, β-diethylaminoethyl methacrylate, 4-vinylpyridine, 2-vinylpyridine, 2-methyl-5-vinylpyridine, a sulfo-aldehyde with up to 7 carbon atoms and mixtures thereof and (2) 90 to 40 weight percent of a copoylmer of vinylidene cyanide and vinyl acetate.

2. A method for manufacturing fibers which comprises mixing and dissolving (1) 10 to 60 weight percent of a reaction product insoluble in water but soluble in an organic solvent of a polymer of vinyl alcohol and a compound selected from the group consisting of an aldehyde with up to 9 carbon atoms, acrylonitrile, urea, phenyl isocyanate, phenylurea, a carboxylic acid with up to 7 carbon atoms, ethylene imine, 1-dimethylamino-2,3-epoxy propane, 1-methylethylamino-2,3-epoxy propane, an amino-aldehyde with up to 10 carbon atoms, allylamine, diethylallylamine, β-diethylaminoethyl methacrylate, 4-vinylpyridine, 2-vinylpyridine, 2-methyl-5-vinylpyridine, a sulfo-aldehyde with up to 7 carbon atoms and mixtures thereof and (2) 90 to 40 weight percent of a copolymer of vinylidene cyanide and vinyl acetate in a common solvent for said reaction product and for said copolymer of vinylidene cyanide and vinyl acetate; and extruding said mixed spinning solution through a small hole for spinning.

3. A method according to claim 2, which comprises dissolving polyvinyl formal together with copolymer of vinylidene cyanide and vinyl acetate in dimethyl sulfoxide to prepare a mixed spinning solution and wet spinning said solution.

4. A method according to claim 2, which comprises mixing and dissolving polyvinyl formal with copolymer of vinylidene cyanide and vinyl acetate in dimethyl sulfoxide and wet spinning said mixed solution into an equeous solution of dimethyl sulfoxide.

5. A method according to claim 2, which comprises mixing and dissolving polyvinyl formal together with copolymer of vinylidene cyanide and vinyl acetate in a mixed solvent of acetonitrile and water, and extruding said mixed spinning solution through a small hole for spinning.

6. The method according to claim 2 in which said common solvent is a solvent system selected from the group consisting of dimethyl formamide, dimethyl sulfoxide, a mixture of dimethyl sulfoxide and water, a mixture of dimethyl formamide and water, a mixture of acetonitrile and water, a mixture of acetone and zinc chloride, a mixture of methyl alcohol and zinc chloride, a mixture of acetone and thiocyanate, a mixture of methyl alcohol and thiocyanate, a mixture of acetonitrile and acetone, a mixture of dimethyl formamide, acetone and water, and a mixture of dimethyl sulfoxide, acetone and water.

7. Shaped articles consisting of (1) 10 to 60 weight percent of a reaction product insoluble in water but soluble in an organic solvent of a polymer of vinyl alcohol and a compound selected from the group consisting of an aldehyde with up to 9 carbon atoms, acrylonitrile, urea, phenyl isocyanate, phenylurea, a carboxylic acid with up to 7 carbon atoms, ethylene imine, 1-dimethylamino 2,3-epoxy propane, 1-methylethylamino-2,3-epoxy propane, an amino-aldehyde with up to 10 carbon atoms, allylamine, diethylallylamine, β-diethylaminoethyl methacrylate, 4-vinylpyridine, 2-vinylpyridine, 2-methyl-5-vinylpyridine, a sulfo-aldehyde with up to 7 carbon atoms and mixtures thereof and (2) 90 to 40 weight percent of a copolymer of vinylidene cyanide and vinyl acetate.

8. Fibers consisting of (1) 10 to 60 weight percent of a reaction product insoluble in water but soluble in an organic solvent of a polymer of vinyl alcohol and a compound selected from the group consisting of an aldehyde with up to 9 carbon atoms, acrylonitrile, urea, phenyl isocyanate, phenylurea, a carboxylic acid with up to 7 carbon atoms, ethylene imine, 1-dimethylamino-2,3-epoxy propane, an amino-aldehyde with up to 10 carbon atoms, allylamine, diethylallylamine, β-diethylaminoethyl methacrylate, 4-vinylpyridine, 2-vinylpyridine, 2-methyl-5-vinylpyridine, a sulfo-aldehyde with up to 7 carbon atoms and mixtures thereof and (2) 90 to 40 weight percent of a copolymer of vinylidene cyanide and vinyl acetate.

9. The fibers according to claim 8 in which the reaction product is polyvinyl formal.

10. The fibers according to claim 8 in which the reaction product is polyvinyl acetal.

11. The fibers according to claim 8 in which the reaction product is polyvinyl benzal.

12. The fibers according to claim 8 in which the reaction product is polyvinyl butyral.

13. The fibers according to claim 8 in which the reaction product is cyanoethylated polyvinyl alcohol.

14. The fibers according to claim 8 in which the reaction product is polyvinyl alcohol acetalized with β-cyclohexylaminobutyraldehyde.

15. The fibers according to claim 8 in which the reaction product is polyvinyl alcohol acetalized with β-aminobutyraldehyde.

References Cited in the file of this patent

UNITED STATES PATENTS

| | | |
|---|---|---|
| 2,636,803 | Cline et al. | Apr. 28, 1953 |
| 2,749,208 | Cline et al | June 5, 1956 |
| 2,952,653 | Heller | Sept. 13, 1960 |
| 2,992,204 | Osugi et al. | July 11, 1960 |

OTHER REFERENCES

C. E. News, Sept. 19, 1955, p. 3933.

UNITED STATES PATENT OFFICE
CERTIFICATE OF CORRECTION

Patent No. 3,137,675                                                        June 16, 1964

Kanji Matsubayashi et al.

It is hereby certified that error appears in the above numbered patent requiring correction and that the said Letters Patent should read as corrected below.

Column 1, line 58, for "any of" read -- either a --; line 61, for "separation" read -- separating --; line 66, strike out "the"; column 2, lines 51 and 52, for "are quite many" read -- have been quite a few --; line 53, strike out "done"; column 3, lines 57, and 70 and 71, for "convertable, each occurrence, read -- convertible --; column 4, line 2, for "of" read -- so --; line 9, for "quite many" read -- quite a few --; line 30, for "becomes" read -- became --; same column 4, line 69, and column 5, line 44, for "passed", each occurrence, read -- passing --; column 5, line 65, strike out "a".

Signed and sealed this 10th day of November 1964.

(SEAL)
Attest:

ERNEST W. SWIDER                                  EDWARD J. BRENNER
Attesting Officer                              Commissioner of Patents